US008527093B2

(12) United States Patent
Kim et al.

(10) Patent No.: US 8,527,093 B2
(45) Date of Patent: Sep. 3, 2013

(54) APPARATUS FOR CONTROLLING THE POSITION OF CRANE TONG ACCORDING TO SLAB BENDING AND THE METHOD THEREOF

(75) Inventors: Dong Wook Kim, Pohang-si (KR); Sang Choul Won, Phang-si (KR); Joo Man Kim, Pohang-si (KR); Young Su Kim, Pohang-si (KR); Kyu Hyun Kim, Pohang-si (KR); Jin Ho Kim, Pohang-si (KR); Se Hoon Kim, Ponhang-si (KR)

(73) Assignee: Posco (KR)

( * ) Notice: Subject to any disclaimer, the term of this patent is extended or adjusted under 35 U.S.C. 154(b) by 570 days.

(21) Appl. No.: 12/677,193

(22) PCT Filed: Sep. 19, 2008

(86) PCT No.: PCT/KR2008/005578
§ 371 (c)(1), (2), (4) Date: Aug. 16, 2010

(87) PCT Pub. No.: WO2009/038399
PCT Pub. Date: Mar. 26, 2009

(65) Prior Publication Data

US 2011/0000866 A1 Jan. 6, 2011

(30) Foreign Application Priority Data

Sep. 20, 2007 (KR) ........................ 10-2007-0095879
Sep. 19, 2008 (KR) ........................ 10-2008-0091929

(51) Int. Cl.
*G06F 7/00* (2006.01)
*G05B 19/18* (2006.01)
*G05B 19/00* (2006.01)

(52) U.S. Cl.
USPC ........... 700/258; 700/217; 700/253; 700/254; 700/259

(58) Field of Classification Search
None
See application file for complete search history.

(56) References Cited

U.S. PATENT DOCUMENTS

| | | | | | |
|---|---|---|---|---|---|
| 4,008,814 | A | * | 2/1977 | Kral et al. | 414/281 |
| 4,604,724 | A | * | 8/1986 | Shaginian et al. | 700/213 |
| 4,606,691 | A | * | 8/1986 | Zalucky | 414/680 |
| 4,715,762 | A | * | 12/1987 | Lanigan et al. | 414/798.1 |
| 5,106,259 | A | * | 4/1992 | Anderson et al. | 414/807 |
| 6,021,911 | A | * | 2/2000 | Glickman et al. | 212/345 |
| 6,081,292 | A | * | 6/2000 | Lanigan et al. | 348/61 |

(Continued)

FOREIGN PATENT DOCUMENTS

| | | | |
|---|---|---|---|
| JP | 54145358 | A | 11/1979 |
| JP | 61186113 | A | 8/1986 |

(Continued)

*Primary Examiner* — Khoi Tran
*Assistant Examiner* — Bao Long T Nguyen
(74) *Attorney, Agent, or Firm* — The Webb Law Firm

(57) ABSTRACT

An apparatus and method for controlling the position of the tongs of a crane depending on bending of a slab are disclosed. Side surface detection units are installed at both ends of the tongs of a crane for gripping the side surfaces of one or more slabs, and are configured to detect one or more gaps generated due to bending of one of the slabs. A distance detection unit is configured to detect the distance between an uppermost slab and the crane. A control unit is configured to adjust the final grip position of the tongs using information about the gaps generated due to the bending of the slab. The information about the gaps is detected by the side surface detection units and the distance detection unit.

13 Claims, 5 Drawing Sheets

(56) References Cited

U.S. PATENT DOCUMENTS

| | | | | |
|---|---|---|---|---|
| 6,161,887 | A * | 12/2000 | Shiota et al. | 294/81.2 |
| 6,256,553 | B1 * | 7/2001 | Erikkila | 700/213 |
| 6,431,625 | B1 * | 8/2002 | Copier | 294/81.5 |
| 6,826,452 | B1 * | 11/2004 | Holland et al. | 700/245 |
| 7,269,479 | B2 * | 9/2007 | Okamoto et al. | 700/245 |
| 7,289,876 | B2 * | 10/2007 | Lussen et al. | 700/213 |
| 7,612,673 | B2 * | 11/2009 | Onderko et al. | 340/572.1 |
| 7,628,575 | B2 * | 12/2009 | Gammerler et al. | 414/790.2 |
| 7,850,025 | B2 * | 12/2010 | Neupert et al. | 212/275 |
| 2005/0242052 | A1 * | 11/2005 | O'Connor et al. | 212/344 |
| 2005/0281644 | A1 * | 12/2005 | Lussen et al. | 414/403 |
| 2008/0017601 | A1 * | 1/2008 | Neupert et al. | 212/270 |

FOREIGN PATENT DOCUMENTS

| | | | |
|---|---|---|---|
| JP | 6259679 | U | 4/1987 |
| JP | 1147379 | U | 10/1989 |
| JP | 3124696 | A | 5/1991 |
| JP | 5085693 | A | 4/1993 |
| JP | 2002214384 | A | 7/2002 |
| KR | 20000006192 | U | 4/2000 |
| KR | 20000020987 | U | 12/2000 |
| KR | 20030022461 | A | 3/2003 |

* cited by examiner

APPARATUS FOR CONTROLLING THE POSITION OF CRANE TONG ACCORDING TO SLAB BENDING AND THE METHOD THEREOF

TECHNICAL FIELD

The present invention relates, in general, to an apparatus and method for controlling the position of the tongs of a crane depending on the bending of a slab, and, more particularly, to a control apparatus and method which rapidly measures the amount of the bending of a slab, the bending of the slab occurring due to uneven cooling, so that a crane can accurately grips one or more slabs.

BACKGROUND ART

A system for controlling a general crane includes a work instruction system configured to have a schedule for crane operations and various types of work information related to the crane operations, and includes the crane configured to be operated using the work instruction system. The crane is divided into a manned crane which is directly operated by a worker and an unmanned crane which is automatically operated.

The crane travels forward and rearward or laterally based on information (the number, kinds of steel, and sizes of the slabs loaded on an arrived vehicle) received from the work instruction system, thereby carrying the slabs to a destination.

Therefore, in the prior art, when a vehicle on which slabs are loaded arrives, the work instruction system operates a crane such that the slabs can be carried to a relevant destination using work information related to the slabs loaded on the currently arrived vehicle. Here, the crane can simultaneously carry one or more slabs loaded on the vehicle. When slabs are carried, the tongs of the crane must accurately grip the center portions of side surfaces of the slabs for the purpose of safety.

However, in the state in which bending occurred due to uneven cooling of a slab, if the crane grips the corresponding slab based on only work information received from the work instruction system while the amount of the bending is not considered, the tongs of the crane cannot accurately grip the center portion of the side surface of the slab.

Therefore, the slab may fall when it is being carried, so that there are problems in that an expensive product is damaged, and in that danger for a high-risk accident or a disaster always exists.

Accordingly, the present invention has been made keeping in mind the above problems occurring in the prior art, and an object of the present invention is to provide an apparatus and method for controlling the position of the tongs of a crane depending on the bending of a slab, which rapidly detects the bending state of one or more loaded slabs and adjusts the position of the tongs of the crane, so that the tongs of the crane can accurately grip the center portions of the side surfaces of the slabs to be carried.

SUMMARY OF THE INVENTION

The characteristic technical configurations of the present invention in order to accomplish the above object are as follows.

An apparatus for controlling the position of the tongs of a crane depending on bending of a slab according to the present invention includes side surface detection units installed at both ends of the tongs of a crane for gripping the side surfaces of one or more slabs, and configured to detect one or more gaps generated due to the bending of one of the slabs; a distance detection unit configured to detect the distance between an uppermost slab and the crane; and a control unit configured to adjust the final grip position of the tongs using information about the gaps generated due to the bending of the slab, the information about the gaps being detected by the side surface detection units and the distance detection unit.

Further, a method of controlling the position of the tongs of a crane depending on the bending of a slab according to the present invention includes the steps of: receiving work information related to one or more slabs from a work instruction system and moving the tongs of a crane; detecting information about one or more gaps generated due to the bending of one of the slabs using side surface detection units and a distance detection unit while moving the tongs of the crane toward the slab; and calculating the final grip position of the tongs by reflecting the detected information about the gaps of the slab into the initial grip position of the tongs, the initial grip position being determined based on the work information, and then moving the tongs of the crane to the final grip position.

According to the present invention, the amount of the bending of a slab is measured when a crane grips a slab, and the grip position of the tongs of the crane is finally determined while considering the amount of the bending of the slab, thereby previously preventing an accident of the slab falling due to an unstable grip on the bent slab.

With the result that, a slab which corresponds to a finished product can be prevented from being damaged due to the accident of the slab falling, so that industrial disaster attributable to the accident of the slab falling can be prevented as well as productivity can be increased.

Further, since the amount of the bending of a slab is rapidly measured during a general process of the tongs of a crane moving to a grip position so as to grip a slab, an accurate grip on the slab can be secured without extending working hours.

BEST MODE FOR CARRYING OUT THE INVENTION

Hereinafter, the technical configuration of the present invention will be described in detail with reference to the attached drawings.

Figure 1:
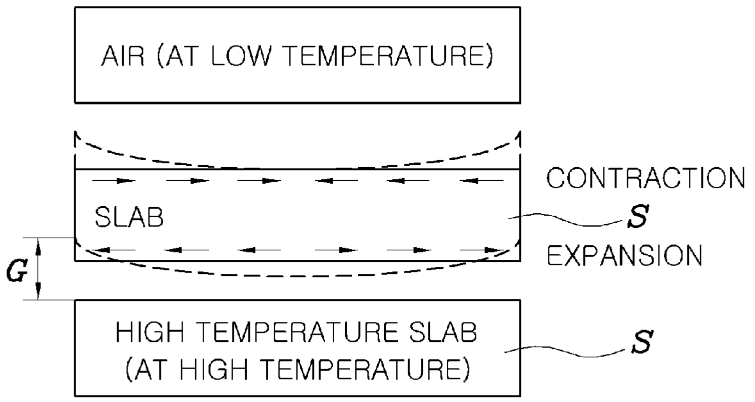
FIG. 1 is a view showing the state in which a general slab is bent.

FIG. 1 shows a process in which a general slab is bent. One or more slabs, which are carried by a vehicle, are at high temperatures, and are cooled when they are carried in the state in which they were loaded on the vehicle. When the slabs are cooled, temperature difference occurs between the upper surface and bottom surface of each of the slabs depending on the loaded state thereof. For this reason, various types of expansion and contraction occur. With the result that, a bending phenomenon, in which the slab 'S' is bent, occurs.

For example, if the bottom surface of a single slab 'S' comes into contact with a slab at a high temperature and the upper surface of the slab 'S' comes into contact with air at a low temperature, the bending phenomenon occurs in that both end portions of the slab 'S' are bent due to uneven cooling caused by the temperature difference between the upper surface and bottom surface, as shown in FIG. 1.

If the bending phenomenon of the slab 'S' occurs, a gap 'G' is generated between adjacent two slabs. The size of the gap 'G' increases in proportion to the amount of the bending of the slab. If the gap 'G' is generated, the position of the center portion of the side surface of the slab 'S' vary, so that the grip position of the tongs of the crane is required to be changed for the purpose of an accurate grip.

If a crane is operated based on only initial work information while the grip position of the tongs of the crane is not changed, the desired number of slabs cannot be gripped, or the slabs are unstably gripped, so that an accident of the slabs being dropped while the slabs are carried may occur, as described above.

The apparatus for controlling the position of the tongs of a crane depending on the bending of a slab according to the present invention has been proposed to solve the above-described problems, and the technical configuration thereof will be described in detail with reference to FIGS. 2 to 6.

Figure 2:
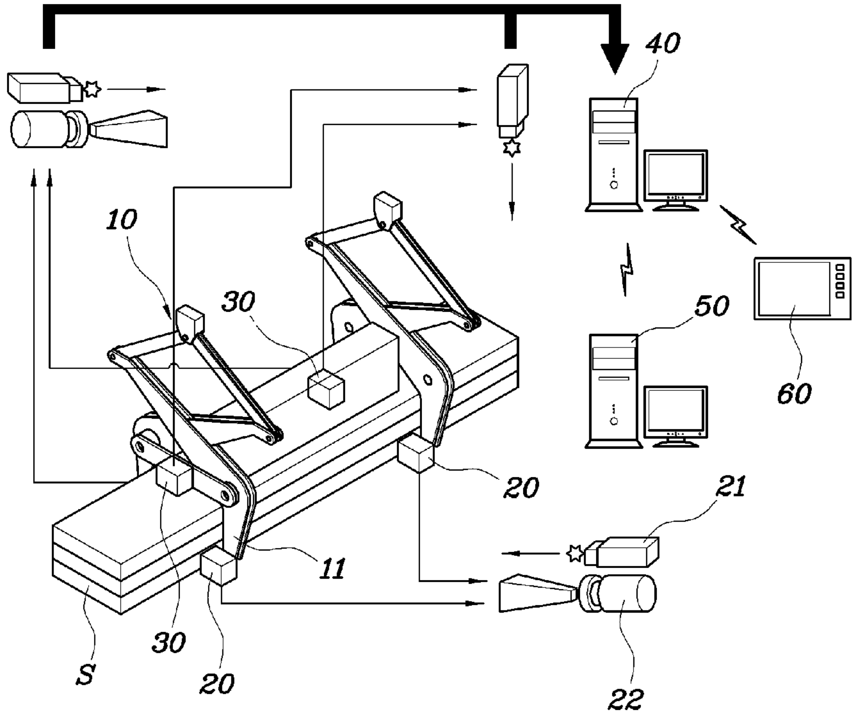
FIG. 2 is a view showing a device for controlling the position of the tongs of a crane according to the present invention.

As shown in FIG. 2, the control apparatus chiefly includes side surface detection units 20 installed at both ends of the tongs 11 of a crane 10 for gripping the side surfaces of one or more slabs 'S', and configured to detect one or more gaps generated due to the bending of one of the slabs 'S'; a distance detection unit 30 installed on the crane 10 and configured to detect the distance between an uppermost slab 'S' and the crane 10; and a control unit 40 configured to adjust the final grip position of the tongs 11 using information about the gaps generated due to the bending of the slab 'S', the information about the gaps being detected by the side surface detection units 20 and the distance detection unit 30.

Each of the side surface detection units 20 includes a laser sensor 21 configured to radiate a laser beam and detect the radiated laser beam while moving across the side surfaces of the slabs 'S', and a vision sensor 22 configured to take images while moving across the side surfaces of the slabs 'S'. The laser sensor 21 is used to measure a distance to the slab using the reflection of the laser beam, and the vision sensor 22 is used to take the images of the side surfaces of the slabs and to detect the positions of gaps using an image processing technique.

The distance detection unit 30 is configured to be mounted on the crane 10, and to include a laser sensor for radiating a laser beam onto the upper surface of the slab 'S', and detecting the radiated laser beam while moving along the crane 10. The laser sensor is the same as the laser sensor 21 which is an element of the side surface detection unit 20, and is used to measure the distance between the crane 10 and the slab 'S'.

The control unit 40 is connected to a work instruction system 50 so that the control unit 40 can transmit and receive the information (the number, kinds of steel, sizes, weights, and destinations of slabs) related to the slabs 'S' to be carried. The control unit 40 measures the final grip position of the tongs 11 and the movement distance based on the final grip position by integrating information about one or more gaps, generated due to the bending of one of the slabs, with work information, and then moves the tongs 11 of the crane 10 to the final grip position, the information about the gaps being received from the side surface detection units 20 and the distance detection unit 30 and the work information being received from the work instruction system 50.

Further, in the case in which the crane 10 is a manned crane directly operated by a worker, the control unit 40 is connected to the crane monitor unit 60 installed in the crane 10 so as to provide the current and final grip positions of the tongs 11 in real time.

Figure 3:
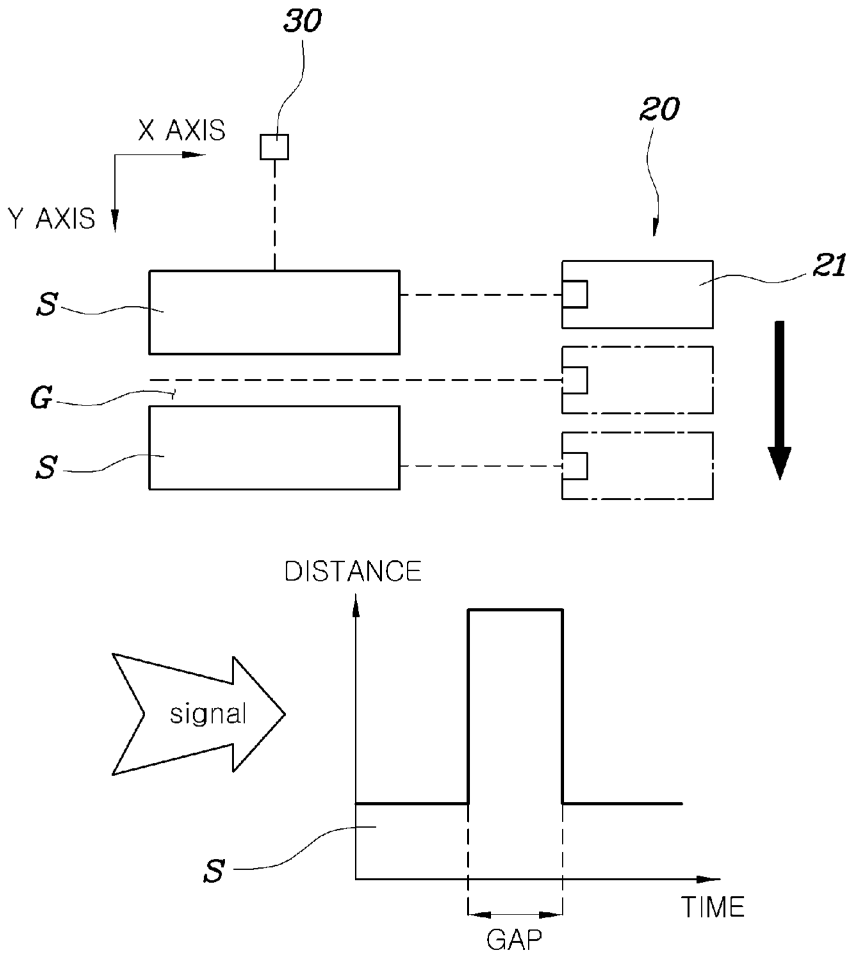
FIG. 3 is a view showing a process of a laser sensor measuring the state in which a slab is bent according to the present invention.
Figure 4:
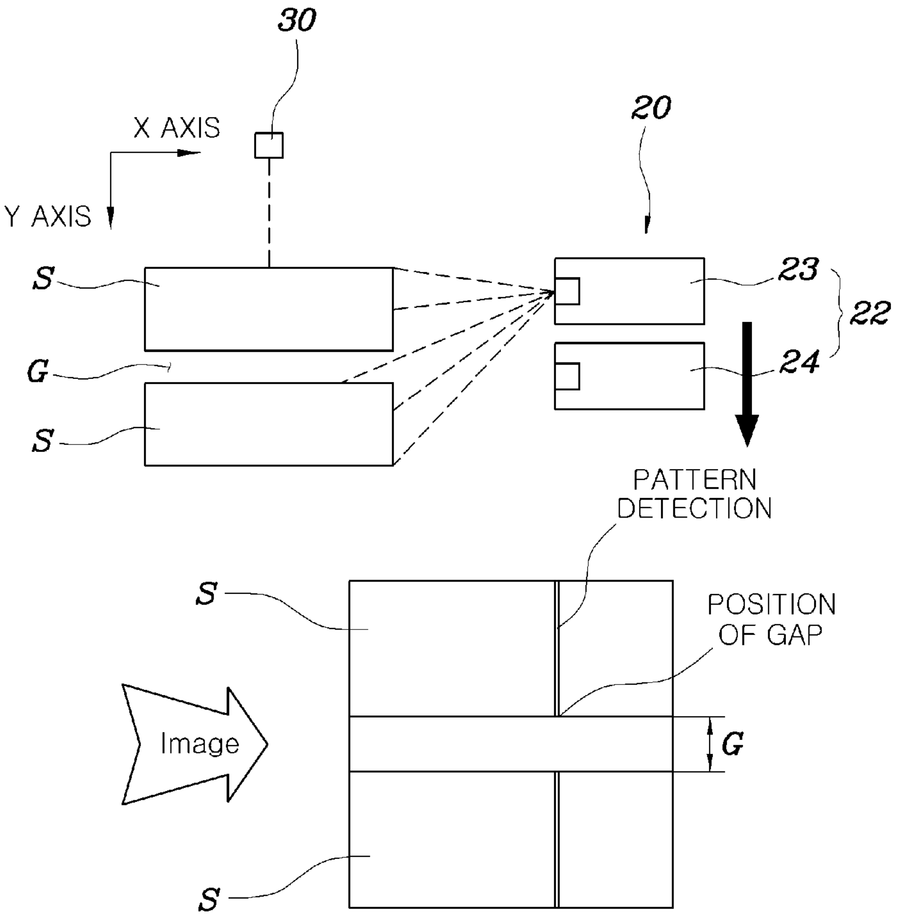
FIG. 4 is a view showing a process of a vision sensor measuring the state in which a slab is bent according to the present invention.

A process of the control apparatus according to the present invention detecting information, such as the positions and sizes of one or more gaps of slabs, using the side surface detection units 20 and the distance detection unit 30 will be described below. FIG. 3 shows a detection process performed by the laser sensor 21 of each of the side surface detection units 20. FIG. 4 shows a detection process performed by the vision sensor 22 of each of the side surface detection units 20.

First, as shown in FIG. 3, the laser sensor 21 moves across the side surfaces of a plurality of loaded slabs 'S' in the Z direction, and radiates a laser beam toward the slabs 'S' in the X direction. The radiated laser beam is reflected from the side surfaces of the slabs 'S', and the laser sensor 21 detects the reflected laser beam and then measures the distance to the side surfaces of the slabs 'S'.

If at least one gap generated due to the bending of one of the slabs exist between adjacent two loaded slabs 'S', the radiated laser beam passes through the gap between the adjacent slabs 'S', the laser sensor 21 cannot detect the reflected laser beam for a specific time period, so that the distance is measured at infinity, as shown in the graph of FIG. 3. Therefore, the existence of a gap is detected.

Here, the distance detection unit 30 radiates a laser beam onto the upper surface of a loaded uppermost slab 'S' along with the movement of the crane, and then detects reflected laser beam, thereby measuring the distance to the slab 'S' in real time. Therefore, the size of the detected gap 'G' can be calculated using the difference of distances to the slab 'S', which are measured by the distance detection unit 30, during a time period from a time point that the laser sensor 21 of the side surface detection unit 20 cannot detect the laser beam (a starting point of the gap) to a time point that the laser beam is detected again (an ending point of the gap).

The laser sensor used to measure the distance to the slab according to the present invention can be replaced by an ultrasonic sensor capable of performing the same function as the laser sensor.

Meanwhile, as shown in FIG. 4, the vision sensor 22 includes a line pattern generation unit 23 and an image taking unit 24. While the vision sensor 22 moves across the side surfaces of the plurality of loaded slabs 'S' in the Z direction, the line pattern generation unit 23 radiates a laser beam onto the side surfaces of the slabs 'S' and forms a specific line pattern, and the image taking unit 24 takes the side surface images of the slabs 'S', which include the line pattern.

When the taken images are combined with each other, an image in which the line pattern is broken in a portion at which the gap 'G' exists is obtained, thereby detecting the existence of the gap, as shown in FIG. 4. The size of the gap 'G', detected by the vision sensor 22, is calculated by the distance detection unit 30, and a detailed method thereof is the same as the method described with reference to FIG. 4.

Figure 7:
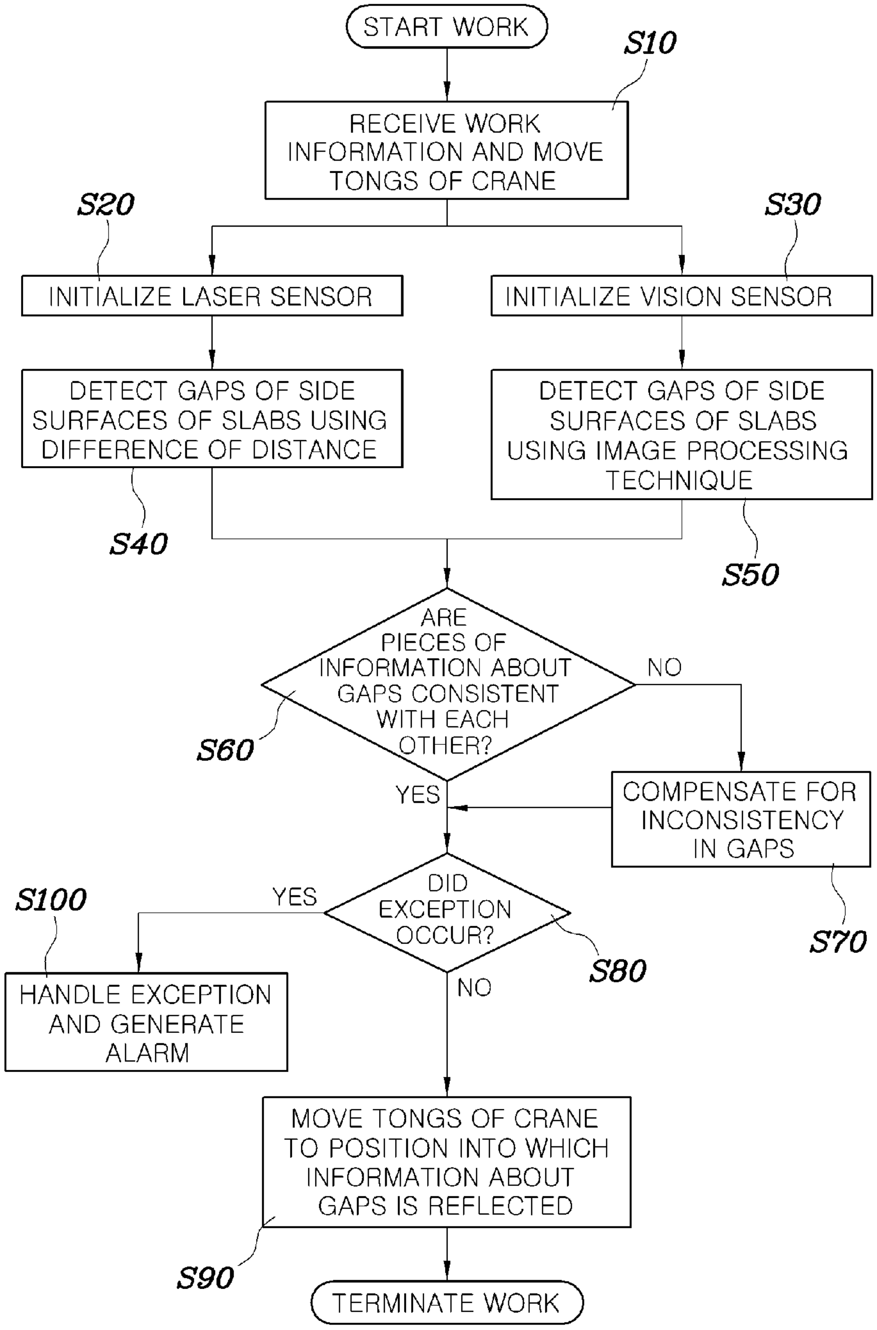
FIG. 7 is a flowchart showing a method of controlling the position of the tongs of a crane according to the present invention.

The present invention can be configured to obtain further accurate information about one or more gaps by comparing pieces of information about the gaps which are detected by the laser sensor 21 and the vision sensor 22 which constitute the side surface detection unit 20, and then compensating for the portions which do not coincide with each other, and a detailed method thereof will be described later with reference to FIG. 7.

Figure 5:
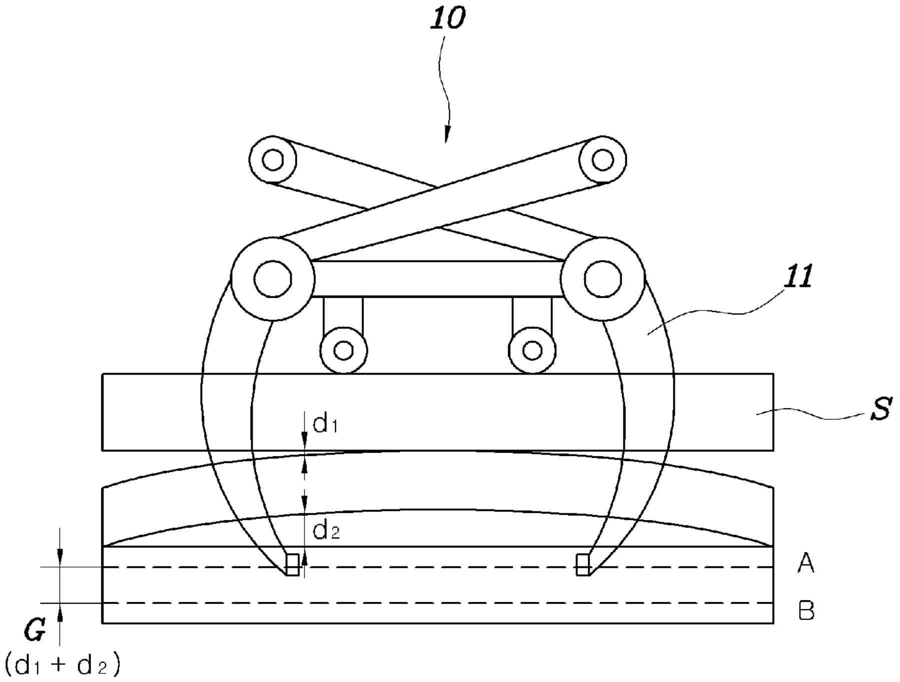
FIG. 5 is a view showing a process of gripping a bent slab according to the present invention.

FIG. 5 shows a process of the control apparatus according to the present invention adjusting the final grip position of the crane 10 using the information about one or more gaps generated due to the bending of one of the slabs 'S', the gap being detected by the side surface detection unit 20 and the distance detection unit 30.

The control unit 40 determines the initial grip position 'A' of the tongs 11 of the crane 10 using work information received from the work instruction system 50, and drops the tongs 11 of the crane 10 toward the initial grip position. While the tongs 11 of the crane 10 are dropped, the pieces of information about the gaps, detected by the side surface detection means 20 and the distance detection unit 30, are obtained. According to the information about the gaps, two gaps 'G' exist between the plurality of loaded slabs 'S', and the respective sizes thereof are d1 and d2. The final grip position 'B', in which the information about the gaps, that is, the total sum of the sizes of the gaps 'd1+d2' is reflected, is calculated, and then the tongs 11 of the crane 10 are dropped to the final grip position 'B'.

As described above, all the processes according to the present invention of calculating the final grip position by detecting the information about the gaps 'G' existing between the slabs 'S' and reflecting the information about the gaps are realized during the time period that the tongs 11 of the crane 10 are moved to the initial grip position 'A', so that additional time period is not required for the control of the present invention.

Figure 6:
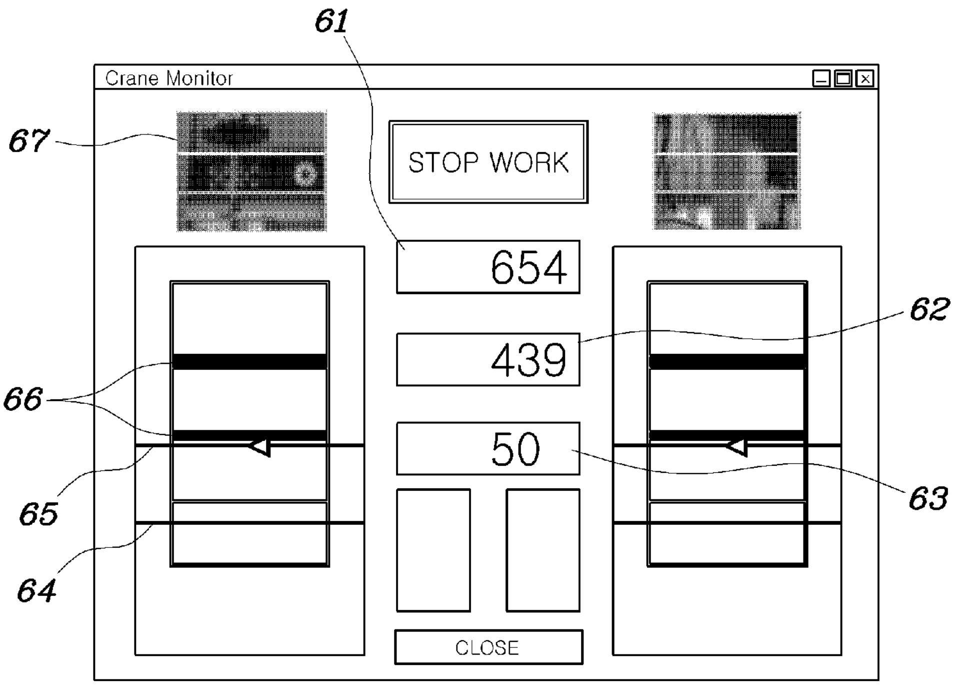
FIG. 6 is a view showing a screen used to monitor a crane according to the present invention.

FIG. 6 shows an example of the screen of the crane monitor unit 60 which is installed in a manned crane and configured to provide the current and final grip positions of the tongs of a crane in real time.

In the center of the screen, the final grip position 61 of tongs to which the information about the gaps is reflected, the current position 62 of tongs which is currently being dropped, and the total sum 63 of the respective sizes of the gaps are displayed in digits. In both sides of the screen, the final grip position 64 of tongs, the current position 65 of tongs, and the respective sizes 66 of gaps are displayed in analog. Further, in the upper portion of the screen, the side surface images 67 of slabs taken by the vision sensor 22 are output. A worker can move the tongs of the crane while watching the crane monitor unit 60 configured as described above.

In conclusion, a method of controlling the final grip position of the tongs of a crane using the above-described apparatus for controlling the position of the tongs of a crane based on the bending of a slab according to the present invention will be described in detail with reference to FIG. 7.

First, the control unit receives work information from the work instruction system, and then moves the tongs of a crane to an initial grip position at step S10.

In order to detect information about one or more gaps, two sensors, that is, the laser sensor and the vision sensor, which constitute each of the side surface detection units are initialized at steps S20 and S30.

While the crane is moved to the initial grip position of one or more slabs, the information about the gaps generated due to the bending of one of the slabs is detected using the side surface detection unit and the distance detection unit at steps S40 and S50.

Here, the laser sensor detects one or more gaps, generated between the side surfaces of the slabs, using the difference of distances, and the vision sensor detects one or more gaps, generated between the side surfaces of the slabs, using an image processing technique. Further, the distance detection unit calculates the respective sizes of the gaps detected by the side surface detection unit using the distance between the upper surface of an uppermost slab and the crane. A detailed description for the side surface detection unit and the distance detection unit is the same as that described with reference to FIGS. 3 and 4.

When the detection of the information about the gaps is completed, the information about the gaps detected by the laser sensor is compared with the information about the gaps detected by the vision sensor, and it is determined whether they are consistent with each other at step S60.

If, as the results of the comparison, both pieces of information about the gaps are not consistent with each other, compensation for inconsistency in the information about the gaps is performed, and final information about the gaps is prepared at step S70. A compensation method includes a method of selecting only consistent portions of both pieces of information about the gaps (AND-type combination) and a method of including all the detected gaps based on the both pieces of information about the gaps (OR-type combination). Further, there may be a method of supplementing one piece of the information about the gaps with reference to the remaining piece of information about the gaps. For example, in the case in which the information about the gaps detected by the vision sensor is determined to be relatively accurate, the information about the gaps detected by the vision sensor is used as reference, and gaps, each of the sizes of which is equal to or larger than a predetermined size, are selected based on the information about the gaps, detected by the laser sensor, and then supplemented with.

If both pieces of information about the gaps are consistent with each other or the compensation for inconsistency in the information about the gaps is completed at step S70, all the sizes of the gaps are summed, and it is determined whether exception occurred in that the total sum of the sizes of the gaps is equal to or larger than a reference value at step S80. The reference value is determined based on the case in which the sizes of the gaps are too large to grip all the slabs to be operated, or the case in which it is determined that there is the danger of an accident of slabs falling because of an unstable grip even though all the slabs can be gripped.

If, as the result of the determination at step S80, the total sum of the sizes of the gaps is equal to or smaller than the reference value, the final grip position of the tongs of the crane is calculated by reflecting the detected information about the gaps of the slabs into the initial grip position of the tongs of the crane, the initial grip position being determined based on the work information, and then the tongs of the crane are moved to the final grip position at step S90.

If, as the result of the determination at step S80, the total sum of the sizes of the gaps is larger than the reference value, an alarm indicative of exception is generated and the crane work is stopped at step S100.

The invention claimed is:

1. An apparatus for controlling a position of tongs of a crane depending on bending of a slab, comprising: side surface detection units installed at both ends of tongs of a crane for gripping side surfaces of one or more slabs, and configured to detect one or more gaps generated due to bending of one of the slabs; a distance detection unit configured to detect distance between an uppermost slab and the crane; and a control unit configured to adjust a final grip position of the tongs using information about the gaps generated due to the bending of the slab, the information about the gaps being detected by the side surface detection units and the distance detection unit.

2. The apparatus according to claim 1, wherein each of the side surface detection units comprises a laser sensor configured to radiate a laser beam and detect the radiated laser beam while moving across the side surfaces of the slabs, and a vision sensor configured to take images while moving across the side surfaces of the slabs.

3. The apparatus according to claim 1, wherein the distance detection unit is a laser sensor for radiating a laser beam onto an upper surface of the uppermost slab and detecting the radiated laser beam while moving along the crane.

4. The apparatus according to claim 1, wherein the control unit is connected to a work instruction system in order to receive work information related to the slabs.

5. The apparatus according to claim 1 wherein the control unit is connected to a crane monitor unit in order to provide information about the grip position of the tongs in real time.

6. The apparatus according to claim 2, wherein the distance detection unit is a laser sensor for radiating a laser beam onto an upper surface of the uppermost slab and detecting the radiated laser beam while moving along the crane.

7. The apparatus according to claim 4, wherein the control unit is connected to a crane monitor unit in order to provide information about the grip position of the tongs in real time.

8. A method of controlling a position of tongs of a crane depending on bending of a slab, comprising the steps of: receiving work information related to one or more slabs from a work instruction system and moving tongs of a crane; detecting information about one or more gaps generated due to bending of one of the slabs using side surface detection units and a distance detection unit while moving the tongs of the crane toward the slab; and calculating a final grip position of the tongs by reflecting the detected information about the gaps of the slab into an initial grip position of the tongs, the initial grip position being determined based on the work information, and then moving the tongs of the crane to the final grip position.

9. The method according to claim 8, wherein: the side surface detection units are installed at both ends of the tongs of the crane for gripping side surfaces of the slabs, and each include a laser sensor for radiating a laser beam and detecting the radiated laser beam while moving across the side surfaces of the slabs and a vision sensor for taking images while moving across the side surfaces of the slabs; and the step of detecting information about the gaps comprises determining whether information about the gaps detected by the laser sensor is consistent with information about the gaps detected by the vision sensor, and obtaining final information about the gaps by compensating for inconsistency in the information about the gaps.

10. The method according to claim 8, wherein the step of detecting information about the gaps further comprises the exception handling step of, if, as a result of determination based on the information about the generated gaps, a total sum of the sizes of the gaps is larger than a reference value, generating an alarm indicative of an exception and stopping operation of the crane.

11. The method according to claim 9, wherein:

the distance detection unit comprises a laser sensor for radiating a laser beam onto an upper surface of an uppermost slab and detecting the radiated laser beam while moving along with the crane; and the step of detecting information about the gaps comprises detecting a distance between the upper surface of the uppermost slab and the crane, and calculating respective sizes of the gaps detected by the side surface detection units using the detected distance.

12. The method according to claim 9, wherein the step of detecting information about the gaps further comprises the exception handling step of, if, as a result of determination based on the information about the generated gaps, a total sum of the sizes of the gaps is larger than a reference value, generating an alarm indicative of an exception and stopping operation of the crane.

13. The method according to claim 11, wherein the step of detecting information about the gaps further comprises the exception handling step of, if, as a result of determination based on the information about the generated gaps, a total sum of the sizes of the gaps is larger than a reference value, generating an alarm indicative of an exception and stopping operation of the crane.

* * * * *

UNITED STATES PATENT AND TRADEMARK OFFICE

CERTIFICATE OF CORRECTION

PATENT NO. : 8,527,093 B2
APPLICATION NO. : 12/677193
DATED : September 3, 2013
INVENTOR(S) : Dong Wook Kim et al.

It is certified that error appears in the above-identified patent and that said Letters Patent is hereby corrected as shown below:

Title Page, Item (75) Inventors, Line 2, delete “Phang-si” and insert -- Pohang-si --

In the Claims

Column 7, Line 17, Claim 5, after “claim 1” insert -- , --

Signed and Sealed this
Fourth Day of February, 2014

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : 8,527,093 B2
APPLICATION NO. : 12/677193
DATED : September 3, 2013
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 806 days.

Signed and Sealed this
Fifteenth Day of September, 2015

Michelle K. Lee
*Director of the United States Patent and Trademark Office*